INVENTOR.
LESLIE F. CARTER
BY
Herbert H. Thompson
HIS ATTORNEY

Oct. 28, 1952        L. F. CARTER        2,615,258
SPEED CORRECTION GEAR FOR GYRO COMPASSES
Filed Oct. 23, 1947        2 SHEETS—SHEET 2
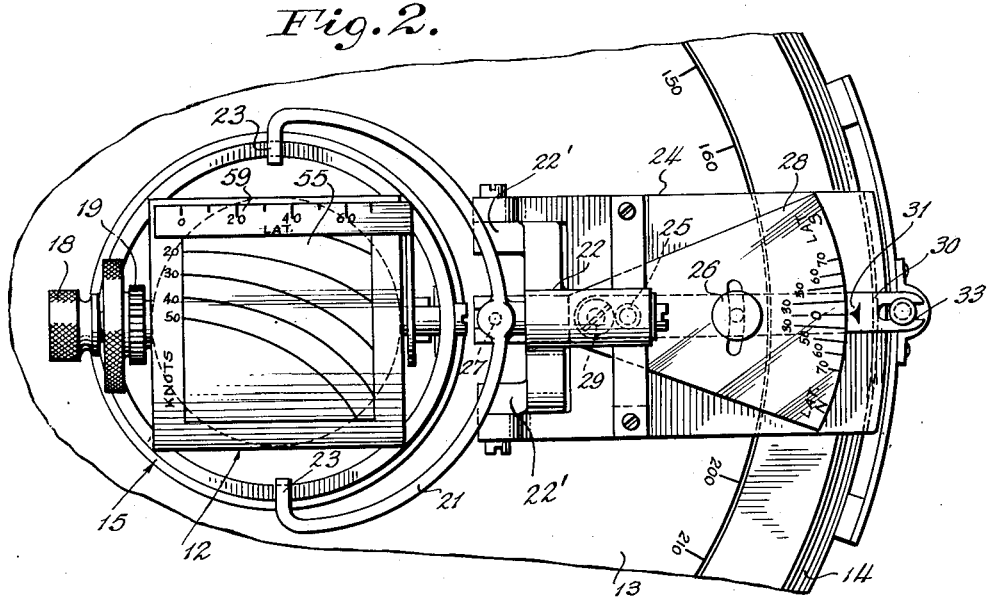
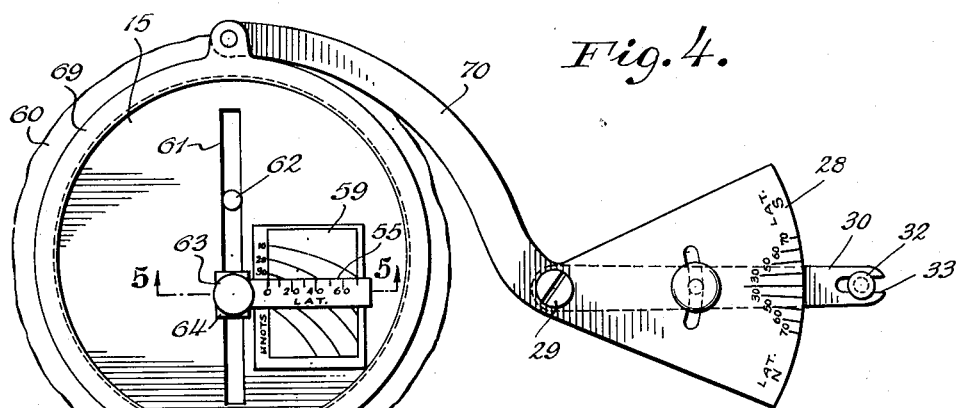
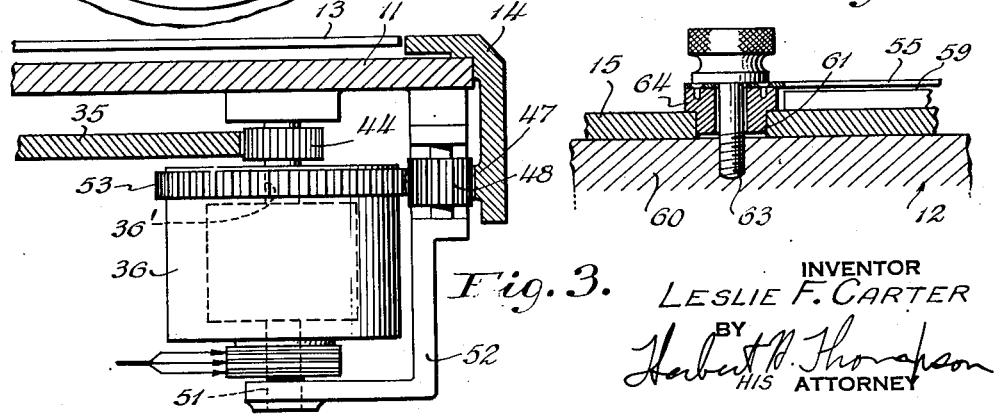
INVENTOR
LESLIE F. CARTER
BY Herbert A. Thompson
HIS ATTORNEY Patented Oct. 28, 1952

2,615,258

UNITED STATES PATENT OFFICE 2,615,258

SPEED CORRECTION GEAR FOR GYRO COMPASSES

Leslie F. Carter, Leonia, N. J., assignor to The Sperry Corporation, a corporation of Delaware Application October 23, 1947, Serial No. 781,737

3 Claims. (Cl. 33—226)

This invention relates to gyroscopic compasses, and particularly to means for correcting the readings of such compasses for errors due to the speed, course and latitude of the craft in which they are carried. The principles on which these corrections are based are set forth in U. S. Letters Patent to Elmer A. Sperry, No. 1,255,480, issued February 15, 1918, and to Harry L. Tanner, No. 1,412,760, issued April 11, 1922.

It is well known that the systematic error of a gyro compass can be expressed by the formula:

Error=$A\ K$ Cos course×sec. latitude+$B$ tan latitude. Where $A$ and $B$ are constants and $K$ stands for the speed of the ship over the sea bottom. The constant $B$ depends on the construction of the compass and in some types of gyro compass the value of $B$ is zero.

One of the objects of the present invention is to provide a correction device of simpler construction and fewer parts than those hitherto known.

A second object of my invention is to eliminate linear sliding motions in the mechanism and to relay entirely on rotary motion. This construction has two advantages since it dispenses with the necessity for accurately machining and fitting of plane sliding surfaces and eliminates backlash in the resultant motion.

A third object of the present invention is to reduce the weight of the whole compass and in particular to reduce the load to be moved by the corrector mechanism itself by eliminating moving parts which hitherto have had to be counterpoised by idle masses.

The invention also relates to the novel features or principles of the instrumentalities described herein, whether or not such are used for the stated objects, or in the stated fields or combinations.

Other objects and advantages of the invention will appear from the appended description when read in connection with the accompanying drawings in which, Fig. 1 is a side view, partly in section of part of a gyro compass with the new correction device mounted thereon;

Fig. 2 is a plan view of the correction device;

Fig. 3 shows a method of operating a transmitter from the correction device alternative to the method of Fig. 1;

Fig. 4 shows in plan an alternative form of part of the mechanism of Fig. 2;

Fig. 5 is a sectional view of a clamping device which forms part of the invention.

Figure 1:
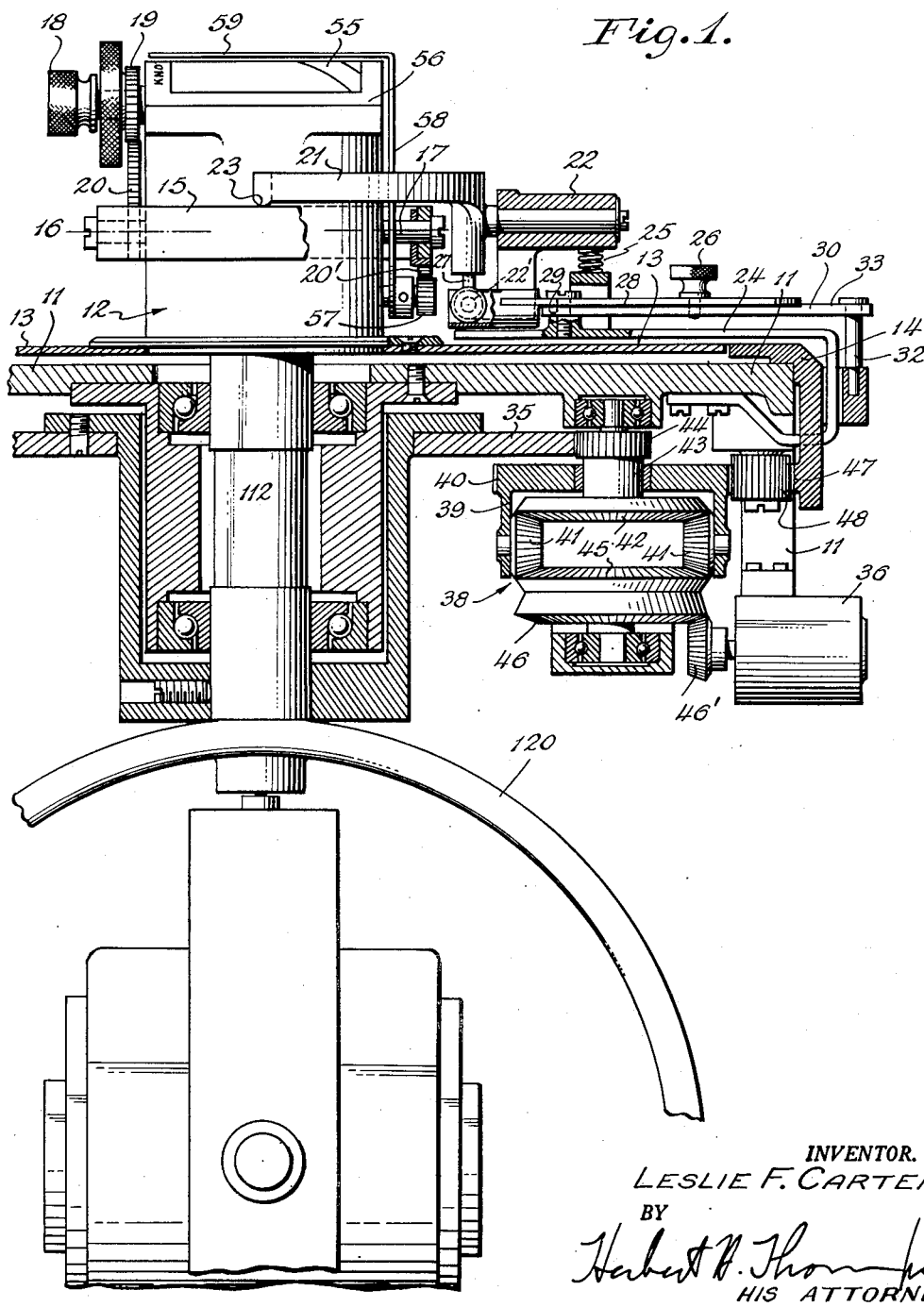

Referring now to Figure 1 it should be observed that the compass includes three separate elements which are capable of different rotations in azimuth. Firstly, there is the main frame 11, usually hung in gimbals, and changing its orientation with the ship. Secondly, the power driven compass element, commonly called the phantom, which is rotatably mounted in the main frame and preserves its geographical orientation so that it appears to turn relatively to the frame when the ship changes course. This element is represented in Figure 1 by the tubular member 12 carrying the compass card 13. This tubular member is fixed to the upper end of stem 112 rotatably mounted in frame 11 and carrying, at its lower end, the phantom ring 120. Thirdly, there is the lubber ring shown in section at 14 which carries the lubber's mark (not shown) indicating the ship's course on the card. The lubber ring is capable of rotating in azimuth on the frame 11 a few degrees either side of its normal or zero position for the purpose of introducing the correction to the indicated course in accordance with the formula above referred to.

The tubular element 12 carries a normally horizontal ring 15 pivoted on a diameter 16, 17 for rotation round a horizontal north-south axis. Ring 15 can be manually tilted through any angle from 0° to about 20° by the knurled knob 18 which drives pinion 19 and toothed wheel 20 fixed solid to ring 15. See Fig. 2.

A fork 21 rotatably mounted in sleeve 22 has downwardly projecting ends 23 which rest on the upper surface of ring 15 at points 180° apart as shown more clearly in Figure 2. Sleeve bearing 22 is pivoted by a pair of lugs 22' on bracket 24 which is bolted to frame member 11, and a spring 25 presses fork ends 23 into contact with ring 15.

If the ship is on either a north or south course, the pivots 16, 17 of ring 15 will be collinear with the axis of the fork in sleeve 22 and fork 21 will have the same inclination as ring 15. If the ship is on either an east or west course, the pivots 16, 17 of ring 15 will lie under the projecting ends 23 of fork 21 and will be at right angles to the axis of the sleeve 22. In that case the fork will have no tilt, whatever the inclination of ring 15. On intercardinal courses the fork will have less tilt than the ring; in fact, the inclination of the fork will be equal to the inclination of the ring multiplied by the cosine of the course. Hence if the inclination of the ring set manually is made equal to $A\ K$ sec. latitude the inclination of the fork 21 will be equal to the first term of the formula for the correction to be applied to the compass.

In order that the cam ring 15 may be initially set by hand according to the speed and latitude of the ship, so as to give the appropriate correction to the compass readings, a chart plate 55 is provided.

This plate is inscribed by engraving or otherwise with a number of speed curves, and is fixed above the fork 21 by mounting bracket 56 attached to the rotating element 12. A toothed wheel 20' fixed to ring 15, engages a pinion 57 journalled in an extension of cylinder 12. The shaft of pinion 57 carries a radial arm 58 bearing a bar 59 which moves above the surface of chart plate 55 according to the inclination given to the ring 15. Bar 59 is marked with a scale of latitudes, said scale and the curves on the chart plate being so calculated that when the mark on the bar corresponding to the ship's latitude is brought over the curve on the chart plate corresponding to the ship's speed, the ring 15 will have the necessary inclination to generate the appropriate compass correction for those conditions.

The manner of introducing this correction to the compass reading is as follows:

Fork 21 carries a downwardly projecting arm 27 which engages the slotted end of lever 28. This lever is rotatably mounted on stud 29 projecting from bracket 24, said bracket being carried on main frame 11.

A second lever 30 independently mounted on stud 29 is provided with a clamp screw 26, tapped into lever 30 and passing through a curved slot in lever 28. This allows lever 30 to be offset by a small angle up to about 5° on either side of the line of lever 28, and clamped solid therewith. A mark 31 on lever 30 cooperates with a scale of latitudes engraved near the end of lever 28, and this permits the amount of offset to be adjusted in accordance with the second term of the correction formula. An upwardly projecting pin 32 mounted on lubber ring 14 engages a radial slot 33 in lever 30 and rotates the lubber ring 14 round the central vertical axis of the compass, so introducing the total correction to the compass readings.

In many cases a gyrocompass is provided with a transmitter for transmitting its indication to other parts of the ship such a transmitter being conveniently driven from an azimuth gear 35 rotating with the phantom element 120. If the transmitter is carried on the main frame 11 the indications transmitted will not be affected by the correction mechanism and will be in error accordingly. This difficulty has been surmounted hitherto by attaching the transmitter to the lubber ring, which causes the correction to be introduced into the transmitted readings. This is objectionable because the location of the transmitter varies with the amount of correction being applied thereby causing variations in the balance of the whole compass in its gimbals. This objection may be got over by attaching a counterpoise to the lubber ring 180° away from the transmitter so that the common center of gravity is on the central axis of the compass. This idle mass however, having to be moved by the corrector mechanism throws an additional load thereon and makes it necessary for the mechanism to be stronger and heavier than would otherwise be the case.

In my invention I avoid these difficulties by novel means as will now be described.

Referring to Figure 1, the azimuth gear 35 drives the transmitter 36, fixed to main frame 11 through a differential gear 38. As shown in the drawing, said differential consists of a frame 39 attached to the under side of a toothed wheel 40 which is freely rotatable on shaft 43. Said frame carries two bevel pinions 41 rotatably mounted on pivots in said frame. These pinions are driven by a bevel wheel 42 on a shaft 43 passing through the center of wheel 40 and carrying a toothed wheel 44 driven by azimuth gear 35. Pinions 41 drive a second bevel wheel 45 integral with a bevel wheel 46 which engages bevel wheel 46' of transmitter 36.

The lubber ring carries at 47 a short section of internal toothed rack gearing with a pinion 48 which drives wheel 40, thus giving the correct direction of rotation to the transmitter. It will be observed that when the various gear ratios are properly chosen, any angular movement given to the lubber ring as a correction by the corrector mechanism will be added algebraically to the normal rotation of the transmitter due to the azimuth gear, and corrected indication will therefore be transmitted to the subsidiary compass dials.

An alternative method of introducing the correction to the transmitter is shown in Figure 3. Here the azimuth gear 35 drives toothed wheel 44 which is fixed to the rotor spindle 36' of the transmitter, said spindle being extended below the transmitter body and journalled at 51 in the bracket 52 attached to frame 11. The transmitter is therefore rotatable about its own spindle. The body or shell 36 of the transmitter carries a toothed wheel 53 and is driven by the lubber ring rack 47, through pinion 48 in the same manner as the differential frame 39 is driven in Figure 1. Hence changes of course are signalled by rotation of rotor spindle 36' relatively to the transmitter body, while corrections are introduced by rotation of the transmitter body relatively to the rotor spindle 36'.

It will be understood that the wires or electric leads 50 forming the connections to the transmitter must in this case have enough slack to allow of rotation of the body of the transmitter through a sufficient angle say about 360°, to introduce the maximum correction in either direction; or, if preferred, a set of conventional slip rings and contact brushes may be used as shown in the drawing.

Without departing from the spirit of this my invention I may, instead of tilting the ring 15, keep it in a horizontal plane and make it more or less eccentric. This form of cam is shown in Figure 4 and comprises a circular ring or disc 15 resting on a flat plate 60 (see Fig. 5) forming the top of the cylindrical phantom member 12 of Figure 1. Disc 15 has a diametral slot 61, and plate 60 has an upwardly projecting pin 62, which closely fits the slot, and a knurl headed clamp screw 63 tapped into the plate. Screw 63 passes through a rectangular block 64 having a fillet on the under side which closely fits slot 61. A chart 59 is engraved on the top surface of disc 15 and a bar 55 graduated according to the latitude projects from the side of block 64. The cam can therefore be adjusted and clamped to have a predetermined amount of eccentricity just as the cam ring of Figures 1 and 2 could be set to have a predetermined amount of tilt.

The cam 15 has a grooved periphery and turns in a sheave 69 which is hinged to a lever 70 which takes the place of the fork 21 and is pivoted on stud 29. The extension of the lever beyond stud 29 takes the place of lever 28 in Figure 1 and the rest of the mechanism is as shown in that figure.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a meridian-seeking gyrocompass for navigable craft having its compass member including a compass card and phantom element all universally supported on the craft and adapted to rotate about a vertical axis, said compass further including a shiftable lubber line adapted to be read against said compass card, a device for correcting the indications provided by said gyrocompass comprising an inclinable cosine cam ring pivotally supported on the phantom element in coaxial relation to the vertical axis of said compass member, means for adjusting the inclination of said cam ring, said means including a chart plate calibrated in terms of craft speed and craft latitude and a cooperating settable cursor operable by said cam adjusting means, said cam ring and chart plate each being symmetrically arranged relative to said vertical axis whereby no tilting torques are imparted thereby to said compass member, a cam follower engaging said cam ring and actuated thereby and arranged to move in azimuth with said craft, the displacement of said cam follower being dependent upon the adjusted inclination of said cam ring and the craft course angle, and means operable by said cam follower for shifting said lubber line.

2. In a meridian seeking gyrocompass for navigable craft having its compass member including a compass card and phantom element all universally supported on the craft and adapted to rotate about a vertical axis, said compass further including a shiftable lubber line adapted to be read against said lubber line, a device for correcting the indications provided by said gyrocompass comprising an inclinable cosine cam ring pivotally supported on the phantom element in coaxial relation to the vertical axis of said compass member, means for adjusting the inclination of said cam ring, said means including a chart plate calibrated in terms of craft speed and craft latitude and a cooperating settable cursor operable by said cam adjusting means, said cam ring and chart plate each being symmetrically arranged relative to said vertical axis whereby no tilting torques are imparted thereby to said compass member, a cam follower engaging said cam ring and actuated thereby and arranged to move in azimuth with said craft, the displacement of said cam follower being dependent upon the adjusted inclination of said cam ring and the craft course angle, a first lever pivoted on the compass frame and actuated by said cam follower, a second lever pivoted coaxially with said first lever and engaging said shiftable lubber line, and means for clamping said second lever to said first lever at a predetermined angle according to the latitude, whereby to introduce the required correction to the compass readings.

3. The gyro compass of claim 1 wherein the means operable by said cam follower for shifting said lubber line includes an adjustable linkage, and means for adjusting said linkage to provide a further shift of said lubber line in accordance with the latitude of the craft.

LESLIE F. CARTER.

REFERENCES CITED

The following references are of record in the file of this patent:

UNITED STATES PATENTS

| Number | Name | Date |
| --- | --- | --- |
| 1,255,480 | Sperry | Feb. 5, 1918 |
| 1,412,760 | Tanner | Apr. 11, 1922 |
| 1,917,017 | Chantemerle | July 4, 1933 |
| 1,984,874 | Gillmor et al. | Dec. 18, 1934 |
| 2,110,766 | Harding | Mar. 8, 1938 |
| 2,128,559 | Harding et al. | Aug. 30, 1938 |
| 2,281,286 | Harding et al. | Apr. 28, 1942 |

FOREIGN PATENTS

| Number | Country | Date |
| --- | --- | --- |
| 154,618 | Great Britain | Mar. 1, 1922 |